United States Patent
Stelling et al.

[11] Patent Number: 5,689,266
[45] Date of Patent: Nov. 18, 1997

[54] TESTING APPARATUS FOR ATC TRANSPONDER FAR COMPLIANCE

[75] Inventors: Desi D. Stelling, Phoenix; Charles L. Dosdall, Scottsdale; James R. Troxel, Glendale, all of Ariz.

[73] Assignee: Honeywell Inc., Minneapolis, Minn.

[21] Appl. No.: 564,511

[22] Filed: Nov. 29, 1995

[51] Int. Cl.⁶ ............................................. G01S 7/40
[52] U.S. Cl. .............................................. 342/165; 342/51
[58] Field of Search ............................ 342/165, 173, 342/174, 42, 51; 367/13; 375/10; 455/115, 226.1

[56] References Cited

U.S. PATENT DOCUMENTS

| | | | |
|---|---|---|---|
| 2,530,093 | 11/1950 | Speed | 342/165 |
| 3,353,181 | 11/1967 | Preuss | 342/165 |
| 4,017,856 | 4/1977 | Wiegand | 342/174 |
| 5,347,280 | 9/1994 | Schuermann | 342/42 |

Primary Examiner—Ian J. Lobo
Attorney, Agent, or Firm—Albert Kau; Ronald E. Champion

[57] ABSTRACT

Airplanes have transponders which receive and transmit signals to communicate information regarding the flight of the airplane. A transponder testing apparatus is integrated into the transponder and verifies that the transponders are operating in accordance to Federal Aviation Regulations.

5 Claims, 2 Drawing Sheets

TESTING APPARATUS FOR ATC TRANSPONDER FAR COMPLIANCE

BACKGROUND OF THE INVENTION

In the airline industry, aircraft are equipped with transponders which assist Air Traffic Controllers in obtaining aircraft identification, altitude and specific data. Air Traffic Controllers work with the transponders in assisting the flight path of airlines. There are two main types of transponders: Air Traffic Control Radar Beacon System (ATCRBS) transponder and the Mode S transponder. ATCRBS type transponders were capable of providing data in reply of an interrogation which may include Mode A, B and/or C.

Mode S is a cooperative surveillance and communication system for air traffic control. A principal feature of Mode S that differs from ATCRBS is that each aircraft is assigned a unique address code. Using this unique address code, interrogations can be directed to a particular aircraft.

According to the Federal Aviation Regulations (FAR) part 43, Appendix E and F, transponders must be inspected and pass within 24 calendar months, certain tests. The tests are: 1) Radio Reply Frequency, 2) Suppression, 3) Receiver Sensitivity, 4) Radio Frequency (RF) Peak Output Power, 5) Mode S Diversity Transmission Channel Isolation, 6) Mode S Address, 7) Mode S Formats Test, 8) Mode S All-Call Interrogations, 9) ATCRBS-Only All-Call Interrogations, and 10) Squitter. In addition, altitude verification reports are required per Appendix E.

Presently, two types of tests have been used to comply with the FAR, part 91, Appendix E and F: 1) Ramp test and 2) Shop test. The ramp tests are those defined to be performed at a gate or hanger facility. Due to the nature of RF measurements tests, ramp tests are subject to environmental and location errors which will make the tests and accurate results extremely difficult. Further, the ramp test equipment may be expensive and also requires between 4 to 10 hours to perform these FAR tests. The shop test typically complies with all aspects of these FAR tests. Further, the shop test requires 2.5 hours to perform and very few operators have the capacity and equipment to perform this test. Another disadvantage of both tests is that they both require a lot of equipment to be connected to the transponder in order to perform these FAR tests. It would be beneficial to have the capability to more consistently and accurately perform the FAR tests with a reduced cost.

SUMMARY OF THE INVENTION

The present invention is a transponder testing system contained within the transponder which verifies that the transponder is operating correctly. Testing is accomplished by performing ten separate tests on the transponder that are required to comply with Federal Aviation Regulations. The associated circuitry within the transponder does the actual testing and includes an oscillator, a transmit frequency circuit, a self test interrogation circuit, and forward power detectors.

DETAILED DESCRIPTION OF THE PRESENT INVENTION

All transponders must comply with Federal Aviation Regulations (FAR) Compliance. The tests are: 1) Radio Reply Frequency, 2) Suppression, 3) Receiver Sensitivity, 4) Radio Frequency (RF) Peak Output Power, 5) Mode S Diversity Transmission Channel Isolation, 6) Mode S Address, 7) Mode S Formats Test, 8) Mode S All-Call Interrogations, 9) ATCRBS-Only All-Call Interrogations, 10) Squitter, and 11) Altitude Verification Reports per Appendix E.

Figure 1:
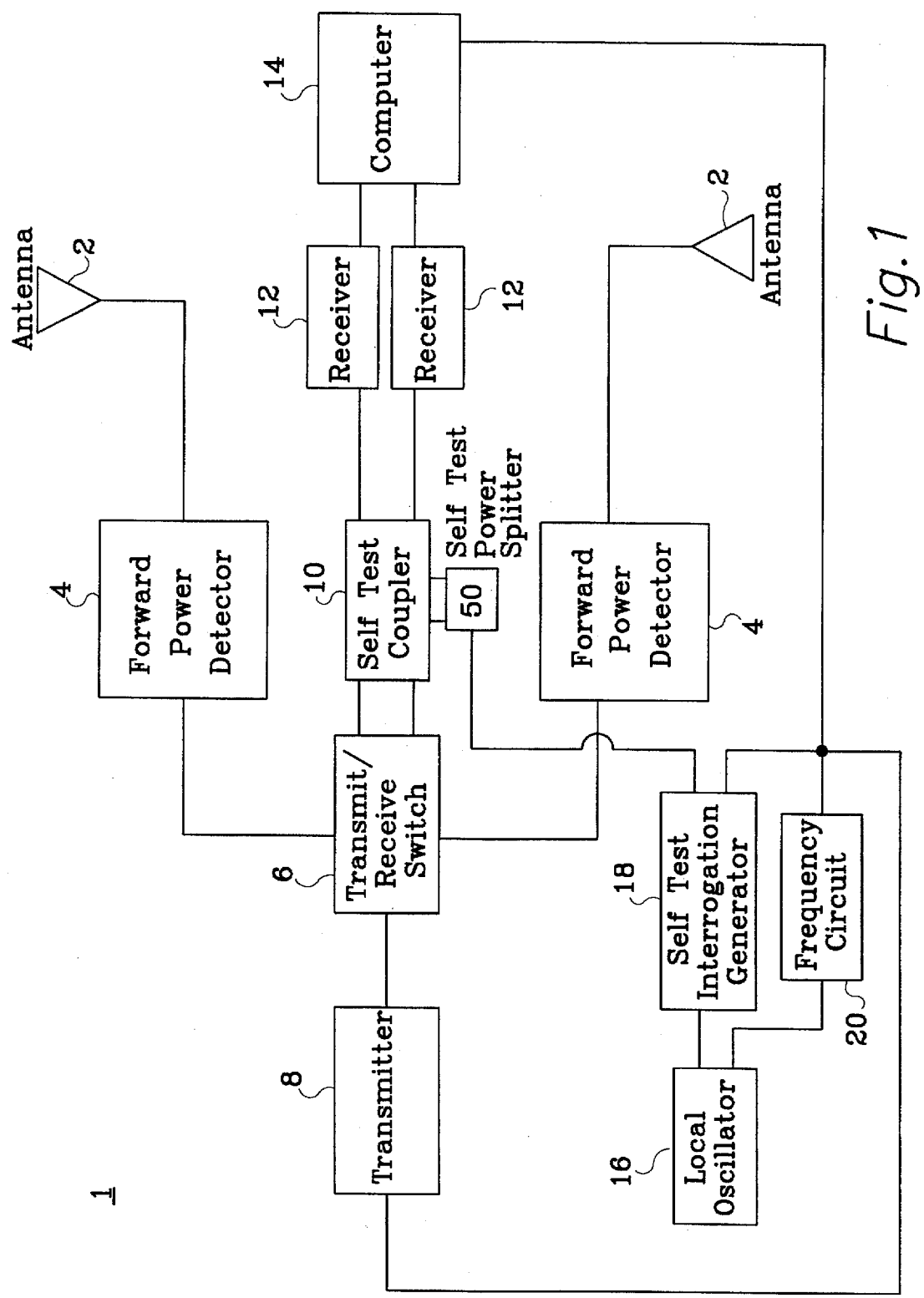
FIG. 1 shows a block diagram of the transponder testing system.

In the present invention, the circuitry required to perform all these tests exists within the transponder 1 as seen in FIG. 1. The transponder 1 includes top and bottom forward power detectors 4 which are connected to top and bottom antennas 2. A transmit/receive switch 6 is connected to the forward power detectors 4. A transmitter 8 is connected to the switch 6 as well as top and bottom receivers 12 which are connected to the switch 6 through self-test couplers 10. The receivers 12 are in turn connected to a computer 14. A local oscillator 16, self test interrogation generator 18, transmit frequency circuit 20 are connected together along with the computer 14 to provide testing for the transponder 1. A self test power splitter 50 is connected to the self-test couplers 10. A signal is injected from the self test interrogation generator 18 into top and bottom receiver 12 paths through the self test power splitter 50 and the self test couplers 10. The local oscillator 16 provides the frequency signals of which the transmitter 8 operates (ie., transmits).

Figure 2:
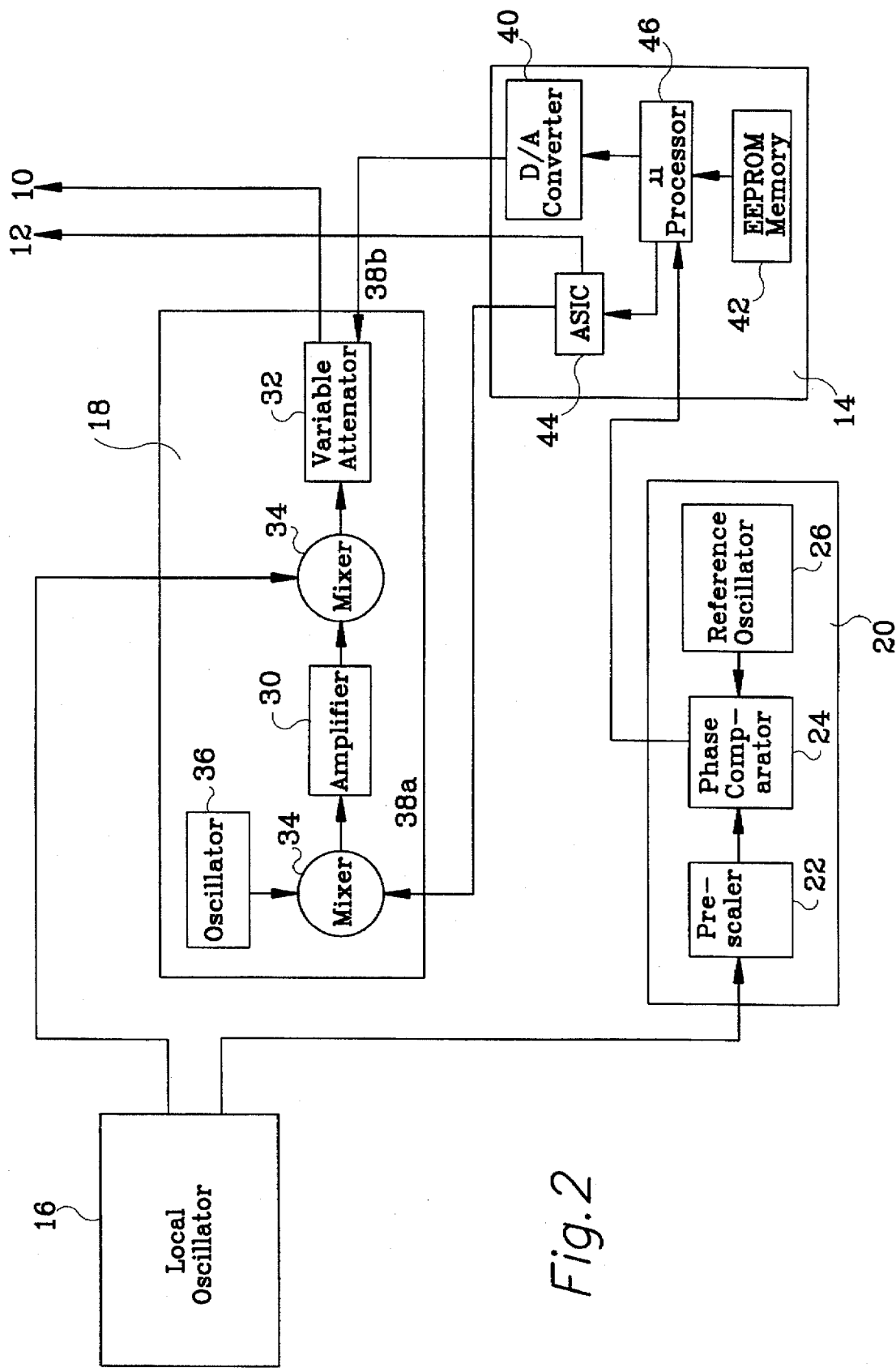
FIG. 2 shows a more detailed schematic of the transponder testing apparatus.

FIG. 2 shows a more detailed block diagram of the transmit frequency circuit 20, and the self-test interrogation circuit 18. The transmit frequency circuit 20 includes a prescaler 22 which is connected to a phase comparator 24 connected to a reference oscillator 26. The phase comparator 24 accepts an input from the prescaler 22 and the reference oscillator 26 to provide a desired signal to the computer 14. The computer 14 includes a D/A converter 40 to convert signals from a digital signal to an analog signal, an EEPROM memory 42 to store data, and an Application-Specific Integrated Circuit (ASIC) 44 which performs various receiver and self-test functions, and a microprocessor 46 which manipulates data and controls the transponder. The transmit frequency circuit 20 is not present in any current transponder testing systems and is especially beneficial in performing tests associated with the FAR tests to Be described in more detail later in the description.

The self-test interrogation circuit 18 includes an oscillator 36 connected to an amplifier 30 which is also connected to a variable attenuator 32. Mixers 34 are placed in between the components to attain signals with desired frequencies. Also, the computer 14 is connected to the self-test interrogation circuit 18 and provides two inputs 38a and 38b. Input 38a is provided to the mixer 34 from the ASIC 44 and is coupled to the oscillator 36 and amplifier 30 to provide a desirable modulation. The second input 38b is provided to the variable attenuator 32 from the D/A converter 40, to provide attenuator control. The variable attenuator 32 is an important component for the FAR tests that will be described in more detail later in the description.

The first test, the Radio Reply Frequency test, tests if the local oscillator 16 is on frequency or rather if the reply frequency is within operating specification or not. The desired frequency is 1090±1 MHz. The frequency of the local oscillator 16 is the transmitted reply frequency. A signal from the local oscillator 16 is coupled into the transmit frequency circuit 20 to create an output. This circuit 20 will independently determine if the reply frequency is within specification and provide an input to the microprocessor 46. Currently no existing transponders have independent circuitry for verifying the transmitter frequency.

For the Suppression test, a fast switching variable attenuator 32, in the self test interrogation circuit 18, is vital in allowing the RF level to be varied to meet test requirements. The suppression test circuitry in existing transponders can only perform at a single power level. The variable attenuator 32 of the self test interrogation circuit 18 and the D/A converter 40 of the computer 14 are used together to vary pulse amplitudes. This test verifies that a transponder 1 does not respond to more than one percent of ATCRBS interrogations when the amplitude of a P2 pulse is equal to a P1 pulse. This test also verifies that the transponder 1 replies to at least ninety percent of ATCRBS interrogations when the amplitude of the P2 pulse is 9 dB less than the P1 pulse. The test signal is injected into the top and bottom receiver paths using the self-test power splitter 50 and the self-test couplers 10.

The Receiver Sensitivity test tests the top and bottom receivers 12 to determine if they are at a minimum triggering level (MTL) which is a minimum level to detect a signal. The MTL of the Mode S transponder is −74+3 dBm. A signal from the microprocessor 46 is converted by the D/A converter 40 into an analog signal which is sent to the variable attenuator 32 in the self-test interrogation circuit 18 to vary levels. This signal is then sent to the top and bottom receivers 12 via the power splitter 50 and self test couplers 10. The MTL can be determined during factory alignment and stored in EEPROM memory 42 in the computer 14 as calibration data. The self-test circuitry in existing transponders is not calibrated to be at a specified amplitude and has a large variation from unit to unit.

The Radio Frequency (RF) Peak Output Power test measures the power out of the top and bottom antenna ports 2, by utilizing a pair of forward power detectors 4. The range for the peak output power of the Mode S transponder is greater than 125 watts (51 dBm) but less than 500 watts (57 dBm). The forward power detectors 4 detect an output power level of the transmitter 8. This information is sent to the computer 14 to verify that the power output complies to the limits above. The calibration data is stored in EEPROM memory 14 of the computer 14.

With the Mode S Diversity Channel Isolation test, the output power of each antenna port 2 is detected and their levels compared. A difference in KF peak output power of 20 dB or greater between the selected antenna and the non-selected antenna creates adequate isolation.

Each airplane has a pre-assigned Mode S Address. The Mode S Address test uses the ASIC 44 with the self-test interrogation circuit 18 to generate interrogations using correct and incorrect addresses. The correct address and at least two other incorrect addresses are used in this test. The forward power detector 4 detects individual pulses in a reply and the computer 14 verifies that a reply was generated and that the data and the reply was correct. Current transponder designs do not demodulate the reply to verify that the correct data was present in a reply such as the present invention does.

In the Mode S Format test, signals from the ASIC 44 are used by the self-test interrogation circuit 18 to generate interrogations using different formats to verify that replies are made in the correct format. The forward power detectors 4 detect individual pulses in the reply and the computer 14 verifies that a reply was generated and that the data and the reply was correct.

The Mode S All-Call Interrogations test is similar to the Mode S Formats test. This test interrogates the Mode S transponder with the Mode S only all-call format and verifies that a correct address and capability are reported in the replies. With this test the computer 14 uses the self-test interrogation circuit 18 to generate a Mode S all-call interrogation. The forward power detectors 4 detect individual pulses in the reply and the computer 14 verifies that a reply was generated and that the data and the reply was correct.

The ATCRBS-only all-call interrogations is also similar to the Mode S Formats test and Mode S All Call Interrogations test. This test interrogates the Mode S transponder with the ATCRBS-only all-call interrogations and verifies that no reply is generated. The computer 14 along with a self-test interrogation circuit 18 generates an ATCRBS all call interrogation. The forward power detectors 4 detect individual pulses in the reply and the computer 14 verifies that no reply was generated.

The last test is the Squitter test. This test verifies that the Mode S transponder generates a correct squitter approximately once per second. To perform this test, the forward power detectors 4 detect individual pulses in the squitter reply and the computer 14 verifies that the data and the reply is correct.

The embodiments of the invention in which an exclusive property or right is claimed are defined as follows:

1. A transponder testing system for an aircraft to test that the transponder is operating correctly in the aircraft comprising:

a transponder having a microprocessor; and a testing apparatus residing in the transponder to test that the transponder is operating correctly, said testing apparatus comprising:

a self test interrogation generator connected to the microprocessor to create a first set of signals for testing;

a transmit frequency circuit connected to the microprocessor to create a second set of signals, different from the first set of signals, for testing; and a local oscillator connected to the self test interrogation generator and the transmit frequency circuit to generate the first and second set of signals and connected to the transmitter for testing.

2. The transponder testing system of claim 1 wherein the self test interrogation generator comprises:

a self test oscillator to create testing signals;

a self test amplifier connected to the self test oscillator via a mixer to amplify the testing signals created by the self test oscillator; and a variable attenuator connected to the self test amplifier via a mixer, and the microprocessor to generate a testing signal based on input from the self test amplifier and the microprocessor.

3. A transponder testing system for an aircraft to test that the transponder is operating correctly in the aircraft comprising:

a transponder;

a top forward power detector connected to a top antenna and a bottom forward power detector connected to a bottom antenna to detect signals and power from the transponder;

a switch connected to the top forward power detector and the bottom forward power detector to control signals to be transmitted and received by the transponder testing system;

a transmitter connected to the switch to transmit signals;

a testing apparatus connected to the transmitter to create signals to meet test requirements;

receivers connected to the switch to receive signals; and a microprocessor connected to the testing apparatus to create signals in conjunction with the testing apparatus.

4. The transponder testing system of claim 3 wherein the testing apparatus of transponder system comprises:

a self test interrogation generator connected to the microprocessor to create a first set of signals to test;

a transmit frequency circuit connected to the microprocessor to create a second set of signals, different from the first set of signals; and a local oscillator connected to the self test interrogation generator and the transmit frequency circuit to generate the first and second set of signals and connected to the transmitter.

5. The transponder testing system of claim 3 wherein the transponder testing system is a single unit that is in a transponder and integrally connected to the transponder.

* * * * *